United States Patent
Min et al.

(10) Patent No.: US 9,346,674 B2
(45) Date of Patent: May 24, 2016

(54) CATALYST FOR A FUEL CELL, A METHOD OF PREPARING THE SAME, AND A FUEL CELL SYSTEM COMPRISING THE SAME

(75) Inventors: Myoung-Ki Min, Suwon-si (KR); Chan-Hee Park, Suwon-si (KR); Hye-A Kim, Suwon-si (KR); Chan Kwak, Suwon-si (KR); Ho-Jin Kweon, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 2164 days.

(21) Appl. No.: 11/260,472

(22) Filed: Oct. 28, 2005

(65) Prior Publication Data

US 2006/0099483 A1    May 11, 2006

(30) Foreign Application Priority Data

Oct. 28, 2004   (KR) .................. 10-2004-0086632
Oct. 28, 2004   (KR) .................. 10-2004-0086633

(51) Int. Cl.
| | |
|---|---|
| *H01M 4/90* | (2006.01) |
| *B82Y 30/00* | (2011.01) |
| *B01J 21/18* | (2006.01) |
| *B01J 23/42* | (2006.01) |
| *B01J 37/16* | (2006.01) |
| *H01M 4/86* | (2006.01) |
| *H01M 4/92* | (2006.01) |
| *H01M 8/10* | (2016.01) |
| *B01J 33/00* | (2006.01) |
| *B01J 35/00* | (2006.01) |

(52) U.S. Cl.
CPC ............. *B82Y 30/00* (2013.01); *B01J 21/18* (2013.01); *B01J 21/185* (2013.01); *B01J 23/42* (2013.01); *B01J 37/16* (2013.01); *H01M 4/8605* (2013.01); *H01M 4/921* (2013.01); *H01M 4/926* (2013.01); *H01M 8/1002* (2013.01); *B01J 33/00* (2013.01); *B01J 35/006* (2013.01); *Y02E 60/523* (2013.01); *Y02P 70/56* (2015.11)

(58) Field of Classification Search
USPC .......................... 429/40–44, 523, 524, 528
See application file for complete search history.

(56) References Cited

U.S. PATENT DOCUMENTS

| | | | | |
|---|---|---|---|---|
| 6,117,581 | A * | 9/2000 | Shelef ........................ | 429/482 |
| 6,824,904 | B2 * | 11/2004 | Brundage et al. ......... | 429/412 |
| 6,824,909 | B2 * | 11/2004 | Mathias et al. ............ | 429/494 |
| 7,189,472 | B2 | 3/2007 | Suenaga et al. | |
| 7,306,824 | B1 * | 12/2007 | Coker ........................ | 427/228 |
| 7,316,860 | B2 * | 1/2008 | Yasumoto et al. ......... | 429/40 |

(Continued)

FOREIGN PATENT DOCUMENTS

| | | |
|---|---|---|
| CN | 1280398 | 1/2001 |
| CN | 1330424 | 1/2002 |

(Continued)

OTHER PUBLICATIONS

Chinese Office Action dated Sep. 25, 2009 for he corresponding Chinese Patent Application No. 200510116976.6.

(Continued)

*Primary Examiner* — Tracy Dove
(74) *Attorney, Agent, or Firm* — Robert E. Bushnell, Esq.

(57) ABSTRACT

The catalyst for a fuel cell of the present invention includes a compound including at least one element selected from the group consisting of silicon, aluminum, and titanium, and a catalytic metal.

20 Claims, 17 Drawing Sheets

(56) References Cited

U.S. PATENT DOCUMENTS

| | | |
|---|---|---|
| 7,662,505 B2 | 2/2010 | Suzuki |
| 7,767,330 B2 * | 8/2010 | Merzougui et al. ........... 429/524 |
| 2004/0009388 A1 * | 1/2004 | Faguy .......................... 429/42 |
| 2004/0202602 A1 | 10/2004 | Masa-aki |

FOREIGN PATENT DOCUMENTS

| | | |
|---|---|---|
| CN | 1425499 | 6/2003 |
| CN | 1507094 | 6/2004 |
| JP | 63-299057 | 12/1988 |
| JP | 02-303541 | 12/1990 |
| JP | 08-321315 | 12/1996 |
| JP | 2003200052 | 7/2003 |
| JP | 2003-221601 | 8/2003 |
| JP | 2004-079244 A | 3/2004 |
| JP | 2004-095263 | 3/2004 |
| JP | 2004-146223 | 5/2004 |
| JP | 2004-172098 A | 6/2004 |
| JP | 2004-214165 | 7/2004 |
| JP | 2004199943 | 7/2004 |
| KR | 1020040063010 | 7/2004 |
| WO | 03-023863 A1 | 3/2003 |
| WO | 2004-028966 | 4/2004 |
| WO | 2004028966 | 4/2004 |
| WO | 2004-040679 A1 | 5/2004 |
| WO | 2004040679 | 5/2004 |

OTHER PUBLICATIONS

Chinese Office Action issued by Chinese Patent Office on Jun. 23, 2011 corresponding to KR2004-0086632 and KR20074-086633 with English abstract attached.

Japanese Office Action issued on Jan. 7, 2011 in the corresponding Japanese Patent Application No. 2005-314299 and Request for Entry of the Accompanying Document herewith.

Japanese Notice of Allowance issued Jul. 17, 2012 in connection with Japanese Patent Application Serial No. 2005-314299, which also claims Korean Patent Application Serial Nos. 10-2004-0086632 and 10-2004-0086633 as its priority documents, and Request for Entry of the Accompanying Office Action attached herewith.

Japanese Office Action issued by Japanese Patent Office on Mar. 2, 2010 in Applicant's corresponding Japanese Patent Application 2005-314299 with its English translation.

* cited by examiner

5nm

5nm

5nm

5nm

5nm

5nm

5nm

5nm

CATALYST FOR A FUEL CELL, A METHOD OF PREPARING THE SAME, AND A FUEL CELL SYSTEM COMPRISING THE SAME

CLAIM OF PRIORITY

This application makes reference to, incorporates the same herein, and claims all benefits accruing under 35 U.S.C. §119 from an application for CATALYST FOR FUEL CELL, METHOD OF PREPARATION AND CHARACTERISTICS SAME AND FUEL CELL SYSTEM COMPRISING SAME earlier filed in the Korean Intellectual Property Office on 28 Oct. 2004 and there duly assigned Serial Nos. 10-2004-0086632 and 10-2004-0086633.

FIELD OF THE INVENTION

The present invention relates to a catalyst for a fuel cell, a method of preparing the same, and a fuel cell system including the same. More particularly, the present invention relates to a catalyst for a fuel cell having an improved supporting ratio and good dispersion properties, a method of preparing the same, and a fuel cell system including the same.

BACKGROUND OF THE INVENTION

A fuel cell is a power generation system for producing electrical energy through the electrochemical redox reaction of an oxidant and a fuel such as hydrogen or a hydrocarbon-based material such as methanol, ethanol, natural gas, or the like.

Representative exemplary fuel cells include a polymer electrolyte membrane fuel cell (PEMFC) and a direct oxidation fuel cell (DOFC). The direct oxidation fuel cell includes a direct methanol fuel cell which uses methanol as a fuel. The polymer electrolyte fuel cell is an environmental-friendly energy source for replacing a conventional energy source. It has advantages such as high power output density and energy conversion efficiency, operability at room temperature, and being down-sized and closely sealed. Therefore, it can be applicable to a wide array of fields such as non-polluting automobiles, electricity generation systems, and portable power sources for mobile equipment, military equipment, and the like.

The fuel cell can be classified into a gas-type fuel cell and a liquid-type fuel cell depending on which kind of fuel is used.

The gas-type fuel cell, which generally uses hydrogen as a fuel, has an advantage of a high energy density, but it also has problems of needing to carefully handle hydrogen gas and requiring accessory facilities such as a fuel reforming processor for reforming methane or methanol, natural gas, and the like in order to produce hydrogen as the fuel gas.

On the contrary, a liquid-type fuel cell, which uses a liquid fuel, has a lower energy density than that of the gas-type fuel cell, but it has the advantages of easy handling of the liquid-type fuel, a low operation temperature, and no need for additional fuel reforming processors. Therefore, it has been acknowledged as an appropriate system for a portable power source for small and common electrical equipment.

In the above fuel cell, the stack that generates electricity substantially includes several to scores of unit cells stacked in multi-layers, and each unit cell is formed of a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) attached to each other with an electrolyte membrane between them.

In general, the anode and the cathode use platinum as a catalyst in various configurations. For example, commonly used is platinum supported in a carbon carrier.

SUMMARY OF THE INVENTION

An embodiment of the present invention provides a catalyst for a fuel cell which can be operated without humidity and which improves the oxidation reaction of fuel in a direct oxidation fuel cell.

Another embodiment provides a method of preparing the catalyst for a fuel cell.

Yet another embodiment of the present invention provides a fuel cell system including the catalyst.

A first embodiment of the present invention provides a catalyst for a fuel cell which includes a compound including at least one element selected from the group consisting of silicon, aluminum, and titanium, and a catalytic metal.

A second embodiment of the present invention provides a catalyst for a fuel cell which includes a carrier including a carbon material and supporting aid, and a catalytic metal supported on the carrier.

A third embodiment of the present invention provides a method of preparing a catalyst for a fuel cell. The method includes the following processes: a compound including at least one element selected from the group consisting of silicon, aluminum, and titanium is added to a catalytic metal precursor solution to prepare a catalyst precursor, the catalyst precursor is heat treated, and the heat-treated catalyst precursor is treated with an acid or base to obtain a catalyst.

A fourth embodiment of the present invention provides a method of preparing a catalyst for a fuel cell. The method includes the following processes: a compound including at least one element selected from the group consisting of silicon, aluminum, and titanium is added to a reducing agent solution to prepare a solution, a catalytic metal precursor is added to the solution to prepare a mixture, the mixture is reduced through treatment of hydrogen gas or heat treatment, and the reduced product is filtrated to obtain a catalyst.

A fifth embodiment of the present invention provides a fuel cell system which includes at least one electricity generating element which generates electricity through oxidation of hydrogen or fuel and reduction of an oxidant, a fuel supplier for supplying hydrogen or fuel to the electricity generating element, and a oxidant supplier for a supplying an oxidant to the electricity generating element. The electricity generating element includes a membrane-electrode assembly which includes a cathode and an anode facing each other, and a polymer electrolyte membrane positioned between the anode and the cathode, and separators positioned at both sides of the membrane-electrode assembly. The anode and the cathode include a catalyst for a fuel cell which includes a compound including at least one element selected from the group consisting of silicon, aluminum, and titanium, and a catalytic metal.

The catalyst may have a layered structure.

The compound may be present in an amount of less than or equal to 15 wt % based on the total weight of the catalyst.

The compound may be present in an amount ranging from 0.1 to 15 wt % based on the total weight of the catalyst.

The compound may be an oxide.

The compound may be at least one selected from the group consisting of a fumed silica, alumina, zeolite, and titania.

The compound may be uniformly present inside the catalyst.

The catalytic metal may be selected from the group consisting of platinum and an alloy of platinum-transition elements (the transition element is at least one selected from the group consisting of V, Cr, Mn, Fe, Co, Ni, Cu, Ru, Ir, W, Mo, and Rh).

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
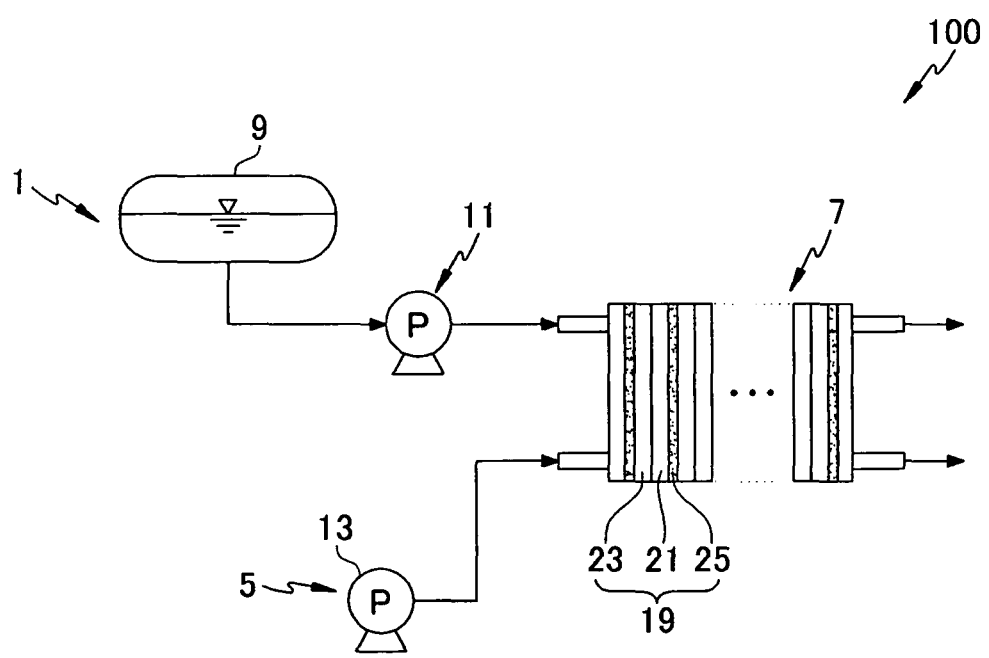
FIG. 1 is a schematic diagram illustrating a structure of a fuel cell system according to the present invention.

An embodiment of the present invention will hereinafter be described in detail with reference to the accompanying drawings.

The present invention relates to a platinum black catalyst or a catalyst supported on a carrier, which is mainly used for a direct oxidation fuel cell (DOFC) such as a direct methanol fuel cell (DMFC). In the present specification, the term "black" means that a catalyst metal is not supported on a carrier.

In general, incipient wetness and impregnation methods are commonly used for supporting platinum on a carrier.

The incipient wetness method is performed as follows: a catalytic metal precursor solution is added to a carrier in an amount appropriate for the pores of the carrier in a drop-wise manner and dried to support the catalyst on the carrier. This method is relatively simple, but when the amount of metal catalyst supported on a carrier is increased, the number of pores of the carrier is very lower compared to the amount of the catalytic metal precursor solution. So as to solve this problem, the concentration of the catalytic metal precursor solution should be increased. However, there is a limit for increasing the concentration due to solubility of the metal catalysts. This method is not suitable for supporting a large amount of a catalyst. Even catalysts prepared in accordance with this method tend to be aggregated to form large particles resulting in deterioration of their efficiency.

The impregnation method is used for preparing a nano-sized platinum or platinum-alloy catalyst and is especially suitable for the small amount of catalyst supported on a carrier due to its simple process. However, since the amount of metal catalysts supported on a carrier is recently being increased so as to increase efficiency of a fuel cell, the impregnation method has revealed some problems for preparing a large amount of catalysts supported on a carrier. That is, a platinum catalyst is not only well-dispersed, but also tends to be aggregated into large particles due to the relatively smaller surface area of carbon than the supported amount of platinum, deteriorating its efficiency despite the high expense.

Therefore, the present invention is to improve the above conventional methods in order to provide a catalyst for a fuel cell which can be well-dispersed despite its large amount if it is supported on a carrier, and which can also be used without humidity and can provide a good oxidation reaction of fuel even if it is not supported on a carrier but is prepared as a black type.

According to a first embodiment of the present invention, a catalyst for a fuel cell includes a compound including at least one element selected from the group consisting of silicon, aluminum, and titanium, and a catalytic metal.

According to a second embodiment of the present invention, a catalyst for a fuel cell includes a carrier including a carbon material and a supporting aid, and a catalytic metal supported on the carrier.

According to a third embodiment of the present invention, a method of preparing a catalyst for a fuel cell is provided. The method includes the following processes: a compound including at least one element selected from the group consisting of silicon, aluminum, and titanium is added to a catalytic metal precursor solution to prepare a catalyst precursor, the catalyst precursor is heat treated, and the heat-treated catalyst precursor is treated with an acid or base to obtain a catalyst.

Henceforth, described is a method of preparing a catalyst of the present invention, depending on a catalyst type, that is, a black-type in which a catalyst is not supported on a carrier, or a supported-type in which a catalyst is supported on a carrier. First, illustrated is a method of preparing the black-type catalyst.

A compound including at least one element selected from the group consisting of silicon, aluminum, and titanium (hereinafter, referred to as "additive compound") is added to a catalytic metal precursor solution to prepare a catalyst precursor. The mixture ratio of the additive compound and catalytic metal precursor solution may be controlled with respect to the kind of additive compound. The appropriate mixture ratio of the additive compound and catalytic metal precursor solution is in the range of 10 to 90 wt %: 90 to 10 wt %. The additive compound may be an oxide, and may preferably include a fumed silica, alumina, zeolite, or titania.

As for the catalytic metal precursor, $H_2PtCl_6$, $PtCl_2$, $PtBr_2$, platinum acetylacetonate, or ammonium tetrachloroplatinate can be used. Solvents for preparing the catalytic metal precursor solution may be water or an alcohol such as methanol, ethanol, isopropanol, and so on.

The catalytic metal precursor solution may be added to the additive compound in drop-wise manner to uniformly coat the solution on the additive compound.

Subsequently, the obtained mixture is heat-treated. The heat-treatment is preformed at 200 to 300° C. and under a reducing atmosphere. Through the heat treatment, the catalytic metal precursor is reduced to become a catalytic metal.

The resultant product is treated with an acid or base by mixing the product and the acid or base. Through the treatment, the additive compound may be removed partially or completely.

The removal can be performed by using either an acid or a base, and can be regulated by concentrating the acid or base or controlling the mixing time. As for the acid, sulfuric acid, hydrochloric acid, phosphoric acid, or nitric acid can be used. The removal can be performed by regulating the pH to be within the range of 2 to 3, or the mixing time to be within the range of 30 minutes to 24 hours. As for the base, NaOH, KOH, $NH_3OH$, $NH_3CO_3$, or $Na_2CO_3$ can be used. The removal can be performed by regulating the pH to be within the range of 10 to 12, or the mixing time to be within the range of 30 minutes to 24 hours.

By the acid or base treatment, the amount of the additive compound remaining in the final catalyst can be regulated to be up to 15 wt %. If the additive compound remains over 15 wt %, it can disadvantageously decrease the conductivity of a catalyst layer, deteriorating cell characteristics.

Here, the acid or base treatment is preferably performed so that a small amount of the additive compound may remain, advantageously at 0.1 to 15 wt %. Since the additive compound has a property of absorbing water and can play a role of self-humidification of the catalyst, it can make it possible to prepare a catalyst that can operate under no humidity. In addition, since the remaining additive compound absorbs water, a catalyst can more effectively work for a fuel oxidation or CO oxidation reaction.

In the black-type catalyst prepared according to the above process the additive compound exists evenly in the catalyst including the catalytic metal and the additive compound. Furthermore, the additive compound exists at up to 15 wt %, and preferably in the range of 0.1 to 15 wt %.

Second, a method of preparing a catalyst including a carrier is discussed. Here, illustration of the same materials and the same processes as used for preparing a black-type catalyst is omitted.

First of all, a carrier is prepared by mixing a carbon material and a supporting aid. Here, the supporting aid is the aforementioned additive compound, which can help a large amount of catalyst metal be supported on the carrier with high dispersion.

As for the carbon material, Vulcan-X, ketjen black, activated carbon, or carbon nanotubes can be used. The carbon material can be used without any treatment, but it is advantageous to desulfurize it in order to remove small sulfur remnants as an impurity, which can damage the properties of a fuel cell.

The desulfurization treatment is performed by heat-treating a carbon-based compound at 400 to 500° C. under an air atmosphere for 5 to 12 hours, and then acid-treating and washing the heat-treated carbon-based compound. The acid treatment is performed at room temperature for 10 to 12 hours, thereby stabilizing the catalyst support and improving the dispersion as the carbon-based compound gains more functional groups such as —OH, —COOH, and so on. In addition, this process can change a property of ketjen black from hydrophobic to hydrophilic. As for the acid, nitric acid, sulfuric acid, phosphoric acid, or fluoric acid can be used.

The washing can be performed with water to remove the acid used, and the heat treatment can also remove a small amount of remaining acid. The firstly heat-treated carbon-based compound is preferably secondly heat-treated at 500° C. for 5 to 24 hours under an air atmosphere to completely remove a small amount of acid remaining even after washing it once or twice.

The weight ratio for mixing the carbon material and the supporting aid is preferably in the range of 1:0.05 to 5. If the supporting aid is used at below the above range, it cannot work well as a supporter, while if used at over the range, a considerable amount of catalytic metal precursor solution could be disadvantageously supported by the supporting aid.

The mixing process may be performed in a solvent such as an organic solvent such as propyl alcohol, isopropyl alcohol, methyl alcohol, ethyl alcohol or ethylene glycol, water, or a mixed solvent thereof to disperse the carbon material and the supporting aid more evenly.

When the mixing of the carbon material and the supporting aid is performed in a solvent, the mixture is then dried and pulverized to a powder state. When the mixing process is preformed without water, the mixture is then pulverized without a drying process.

Subsequently, the catalytic metal precursor solution is added to the carrier to prepare a catalyst precursor.

The amount of the catalytic metal precursor solution to be added can be calculated from the supporting amount on the carrier.

As for the catalytic metal precursor, $H_2PtCl_6$, $PtCl_2$, $PtBr_2$, platinum acetylacetonate, or ammonium tetrachloroplatinate can be used.

In addition, a transition element precursor can further be added to prepare an alloy catalyst including more than binary and preferably binary to quaternary platinum-transition elements. As for the transition elements, V, Cr, Mn, Fe, Co, Ni, Cu, Ru, Ir, W, Mo, or Rh can be used. In general, the same catalyst can be used for an anode and a cathode of a fuel cell. In the present invention, for the transition elements which can be used with platinum, V, Cr, Mn, Fe, Co, Ni, or Cu is used for a cathode, and Ru, Ir, W, Mo, or Rh is used for an anode. As for the precursor, any compound such as a halide, nitrate, hydrochloride, sulfate, amine, and the like can be used, and preferably a halide is used.

The catalytic metal precursor solution may be added to the carrier in a drop-wise manner to uniformly coat the solution on the carrier.

The resultant catalyst precursor may be dried before subsequent heat treatment. When the subsequent drying is carried out, the precursor is dispersed more uniformly. The catalyst precursor can be dried through ultra-sonication. After drying, pulverization can be further performed to obtain a fine powder.

Subsequently, the catalyst precursor is heat treated. The heat treatment is preformed at 200 to 300° C. and under a reducing atmosphere. Through the heat treatment, the catalytic metal precursor is reduced to become a catalytic metal.

The resultant product is treated with an acid or base by mixing the product and the acid or base to prepare a catalyst. Through the treatment, the supporting aid may be removed partially or completely.

The amount of the supporting aid remaining in the final catalyst can be regulated to up to 15 wt %. If the additive compound remains at over 15 wt %, it can disadvantageously decrease the conductivity of a catalyst layer, deteriorating cell characteristics.

The removal of the supporting aid can be performed by using either an acid or a base, and can be regulated by concentrating the acid or base or controlling the mixing time. As for the acid, sulfuric acid, hydrochloric acid, phosphoric acid, or nitric acid can be used. The removal can be performed by regulating the pH to be in the range of 2 to 3 or the mixing time to be in the range of 30 minutes to 24 hours. As for the base, NaOH, KOH, $NH_3OH$, $NH_3CO_3$, or $Na_2CO_3$ can be used. The removal can be performed by regulating the pH to be in the range of 10 to 12 or the mixing time to be in the range of 30 minutes to 24 hours.

Since the supporting aid has a property of absorbing water and can play a role of self-humidification of the catalyst, it can make it possible to prepare a catalyst that can operate under no humidity. In addition, since the remaining additive compound absorbs water, a catalyst can more effectively work for a fuel oxidation or CO oxidation reaction.

In the supported catalyst prepared according to the above process includes the carrier including the carbon material and the supporting aid, and a catalytic meal supported on the carrier. Furthermore, the supporting aid exists at up to 15 wt %, and preferably in the range of 0.1 to 15 wt %.

Alternatively, the catalyst of the present invention can be prepared according to the following process: a compound including at least one element selected from the group consisting of silicon, aluminum, and titanium is added to a reducing agent solution to prepare a solution, a catalytic metal precursor is added to the solution to prepare a mixture, the mixture is reduced through treatment with hydrogen gas or heat treatment, and the reduced product is filtrated to obtain a catalyst.

Henceforth, this method is also described depending on catalyst type, that is, a black-type in which a catalyst is not supported on a carrier, or a supported-type in which a catalyst is supported on a carrier.

An additive solution is prepared by adding a reducing agent aqueous solution to a compound (hereinafter referred to as "an additive compound"), which comprises elements such as silicon, aluminum, and titanium. The reducing agent aqueous solution is prepared by dissolving $NaHSO_3$, ethylene glycol, $NaBH_4$, or an alcohol-based reducing agent in water.

Here, the additive compound is a hydrophilic material, which can be easily removed with an acid or a base treatment, after a catalyst metal is reduced. The compound can preferably be an oxide, and most preferably includes fumed silica, alumina, zeolite, or titania.

The mixing ratio of the reducing agent aqueous solution and the additive compound can be regulated within a proper reaction, but has no particular limit.

The above addition process is preferably performed in the range of pH 4 to 4.5, and the pH can be preferably regulated by using a base such as NaOH, $Na_2CO_3$, or KOH. In addition, the pH of the whole reaction in the present invention is preferably regulated into the range of 4 to 4.5, and accordingly, it needs to be regulated by using a base sometimes when necessary during the reaction Next, a mixture is prepared by adding a catalytic metal precursor to the additive solution. As for the catalytic metal precursor, $H_2PtCl_6$, $PtCl_2$, $PtBr_2$, platinum acetylacetonate, or ammonium tetrachloroplatinate can be used. However, it is not limited to the type in use, that is, it can be a solid or a liquid by being added to water.

It is appropriate to add the catalytic metal precursor at the speed of 0.5 to 10 ml/min, and preferably at the speed of under 2 ml/min for easily forming of smaller particles.

The appropriate mixture ratio of the additive solution and the catalytic metal precursor is in the range of 10 to 90 wt %: 90 to 10 wt %.

A pH controlling agent can be added to the mixture. The pH controlling agent can be $Na_2CO_3$, NaOH, or KOH, and its preferable amount is in the range of 0.5 to 2 M.

Then, an oxidation decomposition reaction can be performed to the mixture by using an oxidant. As for this oxidant, $H_2O_2$ can be used.

In addition, a transition element precursor can further be added to prepare an alloy catalyst including more than binary and preferably binary to quaternary platinum-transition elements. As for the transition elements, V, Cr, Mn, Fe, Co, Ni, Cu, Ru, Ir, W, Mo, or Rh can be used. In general, the same catalyst can be used for an anode and a cathode of a fuel cell. In the present invention, for the transition elements which can be used with platinum, V, Cr, Mn, Fe, Co, Ni, or Cu is used for a cathode, and Ru, Ir, W, Mo, or Rh is used for an anode. As for the precursor, any compound such as a halide, nitrate, hydrochloride, sulfate, amine, and the like can be used, and preferably a halide is used.

Then, the resulting mixture is reduced through a hydrogen gas or heat treatment. The resulting reduction product is filtered to prepare a catalyst for a fuel cell. Here, the additive compound can be partly or completely removed by regulating the filtration. The removal can be performed by using either an acid or a base, and can be regulated by concentrating the acid or base or controlling the mixing time. As for the acid, sulfuric acid, hydrochloric acid, phosphoric acid, or nitric acid can be used. The removal can be performed by regulating the pH to be in the range of 2 to 3 or the mixing time to be in the range of 30 minutes to 24 hours. As for the base, NaOH, KOH, $NH_3OH$, $NH_3CO_3$, or $Na_2CO_3$ can be used. The removal can be performed by regulating the pH to be in the range of 10 to 12 or the mixing time to be in the range of 30 minutes to 24 hours.

The amount of the additive compound remaining in the final catalyst can be regulated up to 15 wt % depending on the filtration. If the additive compound remains over 15 wt %, it can disadvantageously decrease the conductivity of a catalyst layer, deteriorating cell characteristics.

Here, the acid or base treatment is preferably performed so that a small amount of the additive compound may remain, advantageously to 0.1 to 15 wt %. Since the additive compound has a property of absorbing water and can play a role of self-humidification of the catalyst, it can make it possible to prepare a catalyst that can operate under no humidity. In addition, since the remaining additive compound absorbs water, a catalyst can more effectively work for a fuel oxidation or CO oxidation reaction.

A catalyst for a fuel cell prepared according to the present invention includes the additive compound and a catalyst metal, and has a layered structure. In addition, the additive compound exists evenly in the catalyst. Furthermore, the additive compound exists up to 15 wt %, and preferably in the range of 0.1 to 15 wt %.

Second, a method of preparing a catalyst including a carrier is discussed. Here, illustration of the same materials and the same processes as used for preparing a black-type catalyst is omitted. First of all, a carrier solution is prepared by adding a carbon material and supporting aid to a reducing agent aqueous solution. Here, the supporting aid is the aforementioned additive compound, which can help a catalyst metal be supported on the carrier at a high amount and high dispersion.

As for the carbon material, Vulcan-X, ketjen black, activated carbon, or carbon nanotubes can be used. The carbon material can be used without any treatment, but it is advantageous to desulfurize it in order to remove small sulfur remnants as an impurity, which can damage the properties of a fuel cell.

The desulfurization treatment is performed by heat-treating a carbon-based compound at 400 to 500° C. under an air atmosphere for 5 to 12 hours, and then acid-treating and washing the heat-treated carbon-based compound. The acid is treated at room temperature for 10 to 12 hours, thereby stabilizing the catalyst support and improving the dispersion as the carbon-based compound gains more functional groups such as —OH, —COOH, and so on. In addition, this process can change the property of ketjen black from hydrophobic to hydrophilic. As for the acid, nitric acid, sulfuric acid, phosphoric acid, or fluoric acid can be used.

The washing can be performed with water to remove the acid used, and the heat treatment can also remove a small amount of remaining acid. The firstly heat-treated carbon-based compound is preferably secondly heat-treated at 500° C. for 5 to 24 hours under an air atmosphere to completely remove a small amount of acid remaining even after washing it once or twice.

The weight ratio for mixing the carbon material and the supporting aid is preferably in the range of 1:0.05 to 5. If the supporting aid is used at under the above range, it cannot work well as a supporter, while if used at over the range, a considerable amount of catalytic metal precursor solution could be disadvantageously supported by the supporting aid.

The rest of the processes for preparing a catalyst for a fuel cell are the same as those used for preparing a black-type catalyst.

A catalyst for a fuel cell of the present invention features a small amount of remaining supporting aid. It includes a carrier, which includes a carbon material and a supporting aid, and a catalyst metal, which is supported in the carrier, and has a layered structure. The supporting aid exists at up to 15 wt %, and preferably in the range of 0.1 to 15 wt %.

In the catalyst of the present invention, the supported amount of the catalyst metal is larger than that of the conventional fuel cell, since the catalyst metals are supported on the supporting aid as well as the carbon material. Therefore, a catalyst for a fuel cell with improved properties can be provided. In addition, a catalyst for a fuel cell of the present invention has a layered structure. Furthermore, the catalyst has an average diameter of less than or equal to 5 nm, preferably less than or equal to 4 nm, and more preferably ranging from 1 nm to 3 nm.

A cathode and an anode in a fuel cell are distinguished not by materials but by roles, i.e., the anode is for hydrogen oxidation and the cathode is for oxygen reduction. Therefore, a catalyst for a fuel cell of the present invention can be used for both a cathode and an anode. In other words, an anode in a fuel cell is supplied with hydrogen or fuel and a cathode with oxygen, and the anode and cathode can produce electricity through an electric chemical reaction. The oxidation reaction of an organic fuel occurs at the anode and the reduction reaction of oxygen occurs at the cathode, causing a voltage gap between the electrodes.

The cathode and the anode include a gas diffusion layer as an electrode supporter as well as a catalyst of the present invention. As for the gas diffusion layer, carbon paper or carbon cloth can be used, but it is not limited thereto. The gas diffusion layer plays a role of supporting an electrode by diffusing reaction gas and helping the gas easily approach a catalyst layer. In addition, as for the gas diffusion layer, it is preferable to use a carbon paper or a carbon cloth that is water-repellent by being treated with a fluorine-based resin such as polytetrafluoroethylene, because it can protect gas diffusion efficiency from being deteriorated by water produced when a fuel cell works.

In addition, the electrode can additionally include a microporous layer between the gas diffusion layer and the catalyst layer in order to improve the gas diffusion effect of the gas diffusion layer. The microporous layer is formed by applying a composition including a conductive material such as carbon powder, carbon black, activated carbon, acetylene black, and so on, a binder such as polytetrafluoroethylene, and an ionomer when necessary.

The cathode and the anode have a polymer electrolyte membrane therebetween, forming a membrane-electrode assembly. A fuel cell system comprising this membrane-electrode assembly of the present invention includes at least one electricity generating element, a fuel supplier, and an oxygen supplier.

The electricity generating element includes a polymer electrolyte membrane, a cathode and an anode at both sides thereof, and a separator, and plays a role of generating electricity through the electrochemical reaction of hydrogen and oxygen.

The fuel supplier plays a role of supplying the electricity generating element with a fuel such as hydrogen, and the oxygen supplier plays a role of supplying the electricity generating element with oxygen.

FIG. 1 shows the schematic structure of a fuel cell system of the present invention. A more detailed illustration is provided with the reference to this accompanying drawing as follows. A fuel cell system 100 of the present invention comprises a stack 7 with at least one electricity generating element 19, which can generate electrical energy, a fuel supplier 1, which supplies hydrogen or fuel, and an oxidant supplier 5, which supplies the electricity generating element 19 with an oxidant.

In addition, the fuel supplier 1 is equipped with a fuel tank 9, which stores fuel, and a fuel pump 11, which is connected therewith. The fuel pump 11 supplies fuel stored in the tank 9 with a predetermined pumping power.

The oxidant supplier 5, which supplies the electricity generating element 19 of the stack 7 with an oxidant, is equipped with at least one air pump 13 drawing in an oxidant with a predetermined pumping power.

Some such fuel cell systems use pumps to supply the fuel and/or oxidant to the electricity generating element and others supply the fuel and/or oxidant in a diffusion manner rather than by using pumps and the invention is not to be limited to any one specific fuel cell system.

The electricity generating element 19 comprises a membrane-electrode assembly 21, which oxidizes hydrogen gas or fuel and reduces an oxidant, and separators 23 and 25 at both sides thereof, which can supply hydrogen gas and air including oxygen.

The following examples illustrate the present invention in more detail. However, it is understood that the present invention is not limited by these examples.

REFERENCE EXAMPLE 1

Ketjen black was heat-treated at 500° C. for 10 hours under an air atmosphere. 5 g of the heat-treated ketjen and 500 ml of $HNO_3$ were mixed for acid treatment at room temperature for 24 hours and then filtered. Next, the resulting ketjen black was washed with water, dried, and heat-treated again at 500° C. for 24 hours under an air atmosphere, and then desulfurized to remove sulfur of which a little may remain as an impurity.

The desulfurized ketjen black was mixed with a fumed silica in a weight ratio of 1:1 in a solvent including n-isopropyl alcohol, isopropyl alcohol and water in a volume ratio of 1:1:1 using a ball-mill.

The mixture was dried and pulverized using a grinder to prepare carrier in a powder state.

$H_2PtCl_6$ as a Pt precursor solution was added to the carrier to prepare a catalyst precursor. The catalyst precursor was dried by ultra-sonication and then heat-treated at 200° C. under a $H_2$ atmosphere to prepare a catalyst.

The resultant catalyst included 33 wt % of fumed silica and 33 wt % of Pt based on the total weight of the catalyst.

Figure 2:
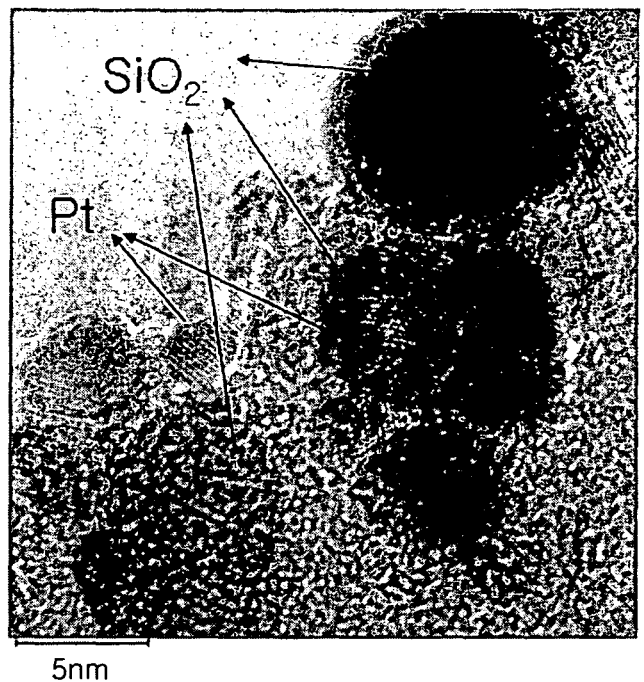
FIG. 2 and FIG. 3 are transmission electron microscope (TEM) photographs of the catalyst for a fuel cell prepared according to Reference Example 1.
Figure 3:
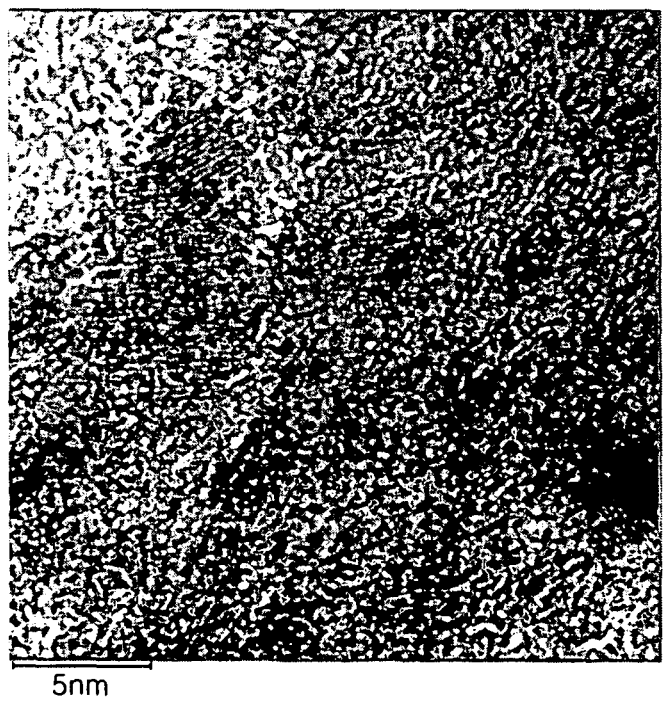

FIGS. 2 and 3 show TEM photographs of a catalyst for a fuel cell prepared according to Reference Example 1. As shown in FIGS. 2 and 3, the catalyst prepared according to Reference Example 1 turned out to have a particle size of 2 to 3 nm. In FIG. 2, particles of a size of about 10 nm are considered to be fumed silica. On the surface of the fumed silica, platinum is supported, which is confirmed by the lattice structure.

Figure 4:
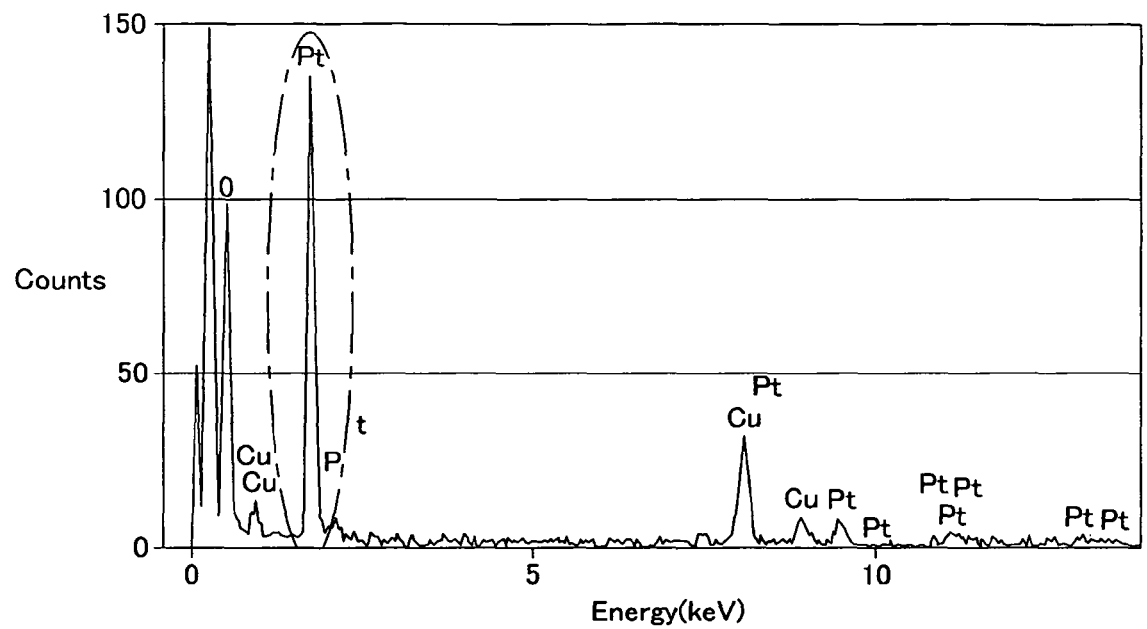
FIG. 4 and FIG. 5 are EDX (Energy Dispersive X-ray) analysis graphs of the catalyst prepared according to Reference Example 1.
Figure 5:
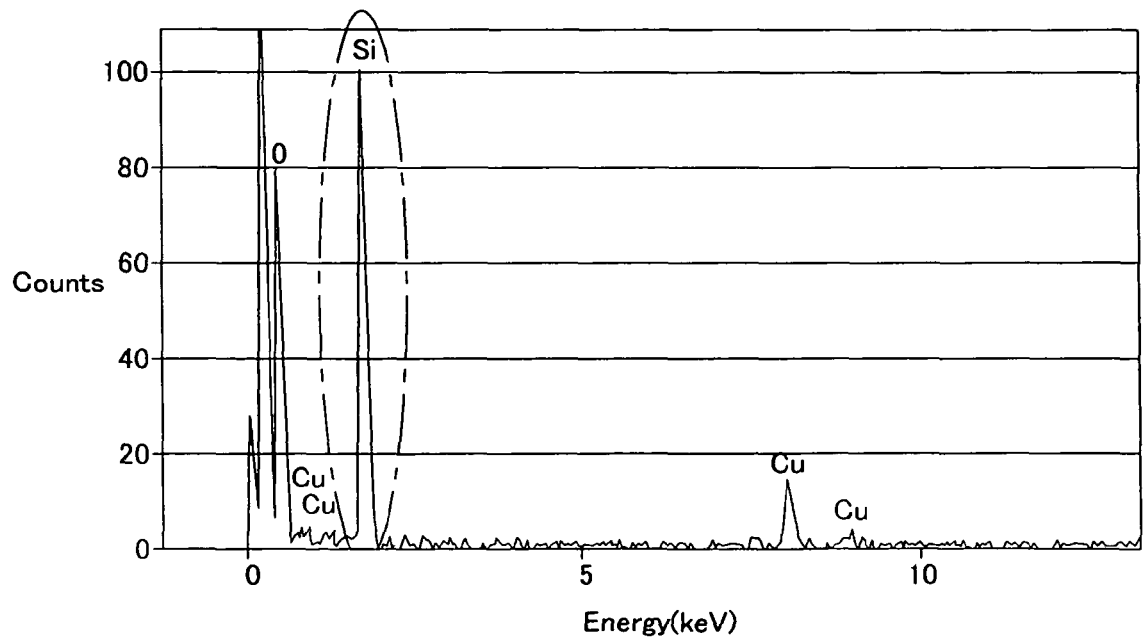

FIGS. 4 and 5 are EDX analysis results measured at two different positions of the catalyst according to Reference Example 1, respectively. The results show that platinum is well-dispersed.

EXAMPLE 1

A catalyst was prepared according to the same method as in Reference Example 1, except that the product heat-treated according to Reference Example 1 was agitated in 0.5M NaOH for 2 hours, then filtrated and dried. The resultant catalyst included 2 wt % of fumed silica.

Figure 6:
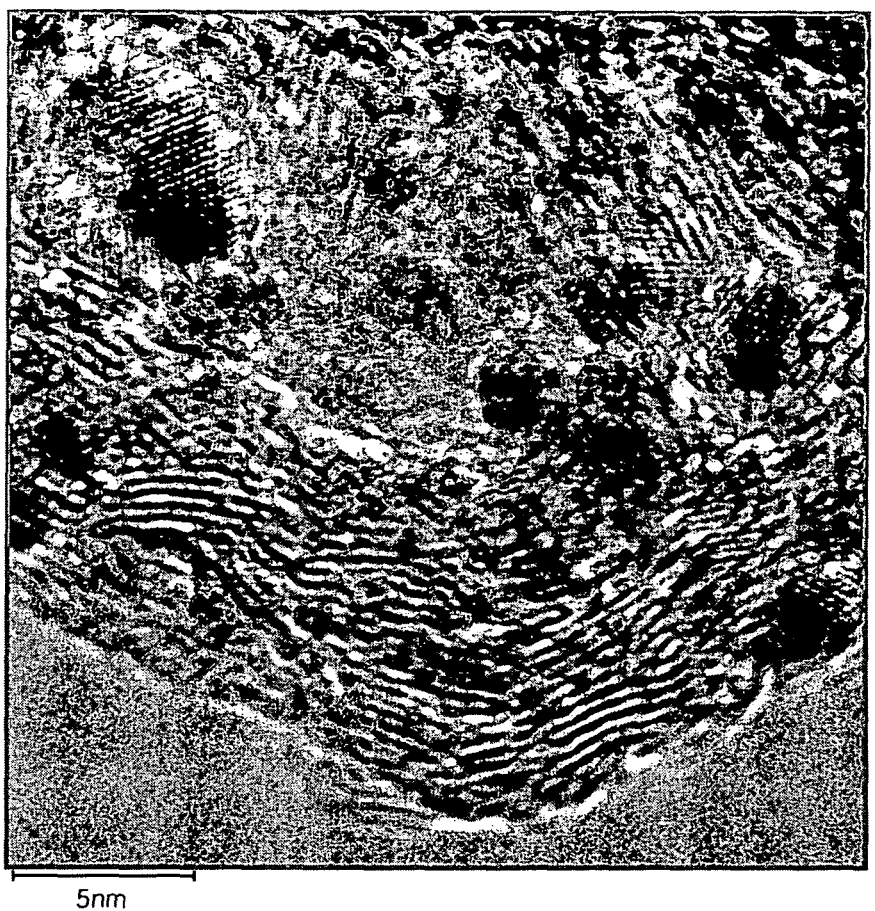
FIG. 6 is TEM photograph of the catalyst for a fuel cell prepared according to Example 1.
Figure 7:
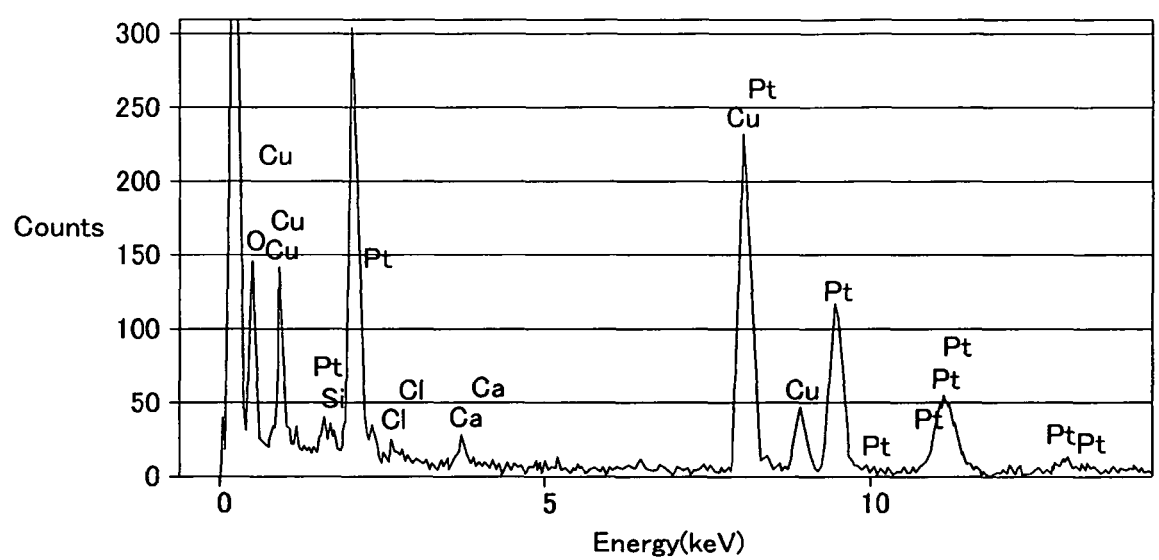
FIG. 7 is an EDX analysis graph of the catalyst prepared according to Example 1.

FIG. 6 shows a TEM photograph of a catalyst prepared according to Example 1 and FIG. 7 shows an EDX analysis result thereof. As shown in FIG. 6, the catalyst prepared according to Example 1 turned out to have a particle size of 2 to 3 nm, with no large catalyst particles. FIG. 7 shows that platinum is well-dispersed and a trace of Si remains.

REFERENCE EXAMPLE 2

Vulcan-X was heat-treated at 500° C. for 10 hours under an air atmosphere. 5 g of the heat-treated Vulcan-X and 500 ml of $HNO_3$ were mixed for an acid treatment at room temperature for 24 hours and then filtered. Next, the resulting Vulcan-X was washed with water, dried, and heat-treated again at 500° C. for 24 hours under an air atmosphere, and then desulfurized to remove sulfur of which a little may remain as an impurity.

A 60 wt % concentration of $NaHSO_3$ reducing agent aqueous solution was prepared by adding 4 g of $NaHSO_3$ to 500 ml of $H_2O$. The reducing agent aqueous solution was added to 476.01 mg of the desulfurized Vulcan-X carbon carrier and 476.01 mg of a fumed $SiO_2$ supporting aid, preparing a carrier solution.

The carrier solution was slowly added to an 8 wt % concentration of a $H_2PtCl_6$ precursor aqueous solution at the speed of 2 ml/m in a drop-wise fashion, until the amount of $H_2PtCl_6$ reached 12.5 g (corresponding to the amount of platinum: 476.01 mg). While a platinum solution was being added in a dropwise fashion, a 5 wt % concentration of NaOH aqueous solution base which was prepared by adding 5 g of NaOH to 95 g of $H_2O$ was added in a dropwise fashion to maintain pH 4 to 4.5. Then, 0.6M of a $Na_2CO_3$ aqueous solution which was prepared by adding 0.7631 g of $Na_2CO_3$ to 12 ml of $H_2O$ was slowly injected therein to reduce the mixture. Next, 60 ml of $H_2O_2$ was injected at the speed of 2 ml/m to oxidize platinum particles again, maintaining pH 4 to 4.5 with a 5 wt % concentration of NaOH solution.

Then, the resulting solution was reacted for a liquid reduction by hydrogen gas bubbling for four hours, and it was agitated for a night, filtered, and washed to prepare a catalyst for a fuel cell.

EXAMPLE 2

A catalyst prepared according to Reference Example 2 was maintained in a 60° C. vacuum oven for one day, treated twice with 0.5M of NaOH to remove the fumed silica, filtered, and dried in an oven, preparing a catalyst for a fuel cell. Here, the prepared catalyst included 2 wt % of fumed silica.

Figure 8A:
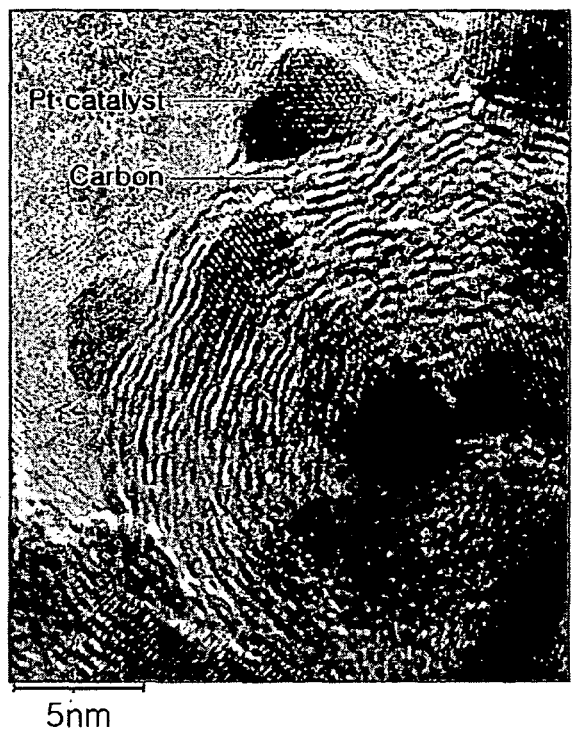
FIG. 8A to FIG. 8C are transmission electron microscope (TEM) photographs of the catalyst for a fuel cell prepared according to Reference Example 2.
Figure 8B:
Figure 9:
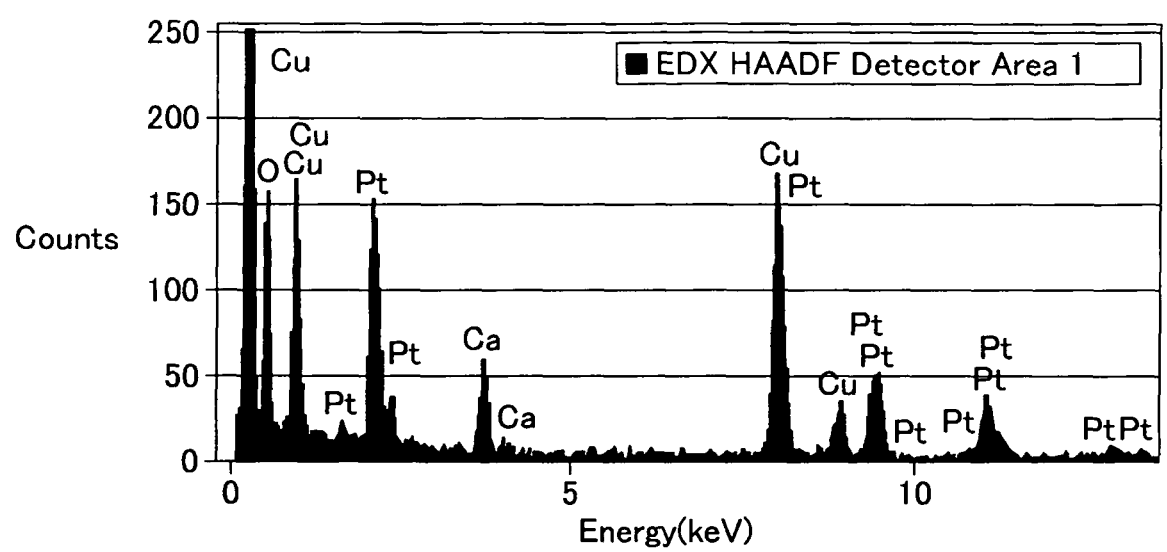
FIG. 9 is an EDX (Energy Dispersive X-ray) analysis graph of the catalyst prepared according to Reference Example 2.
Figure 10A:
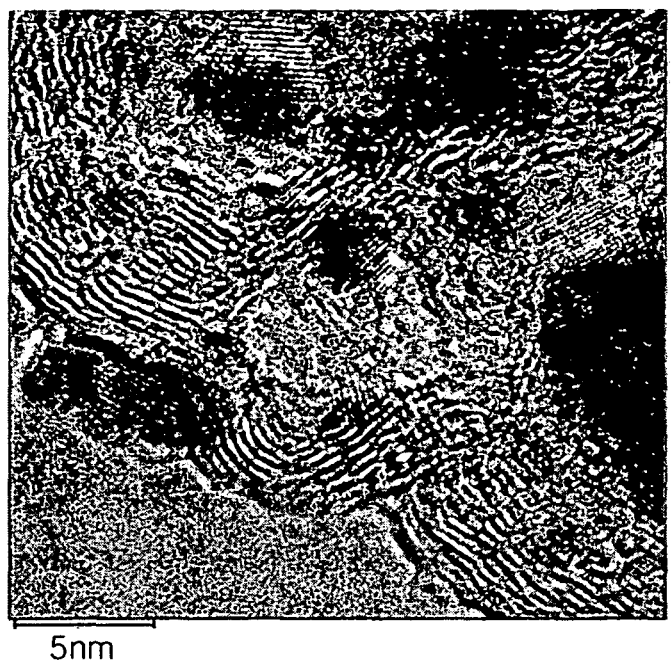
FIG. 10A to FIG. 10C are TEM photographs of the catalyst for a fuel cell prepared according to Example 2.
Figure 10B:
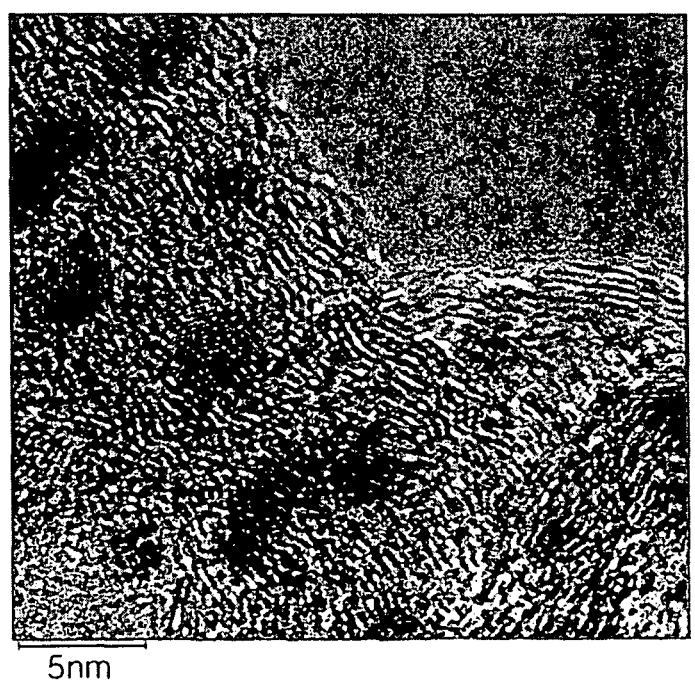
Figure 11:
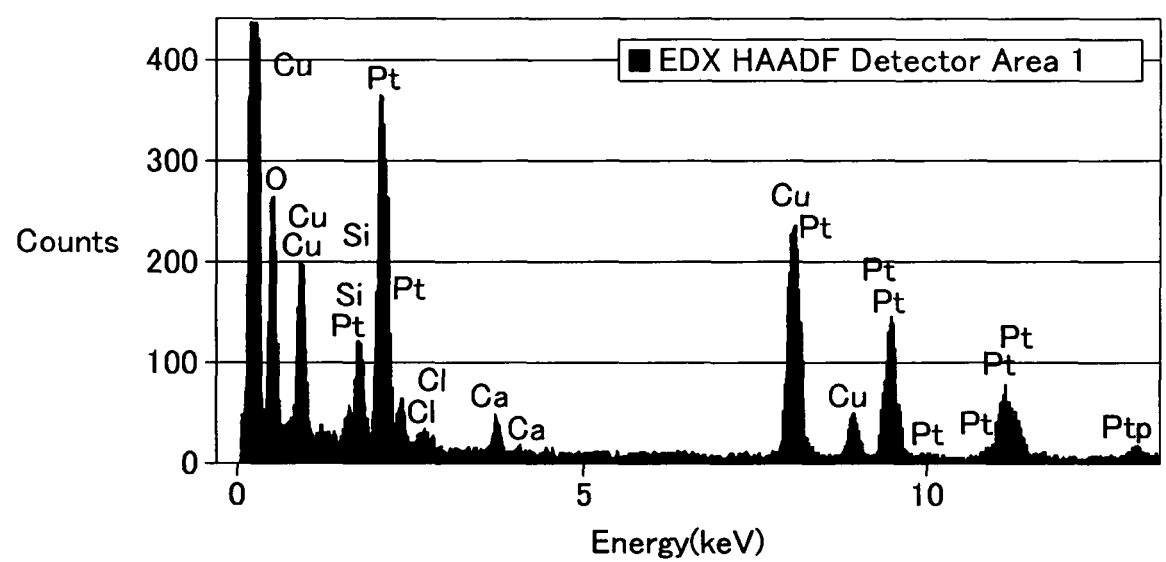
FIG. 11 is an EDX analysis graph of the catalyst prepared according to Example 2.

FIGS. 8A and 8B show TEM photographs of a catalyst for a fuel cell prepared according to Reference Example 2, FIG. 9 is its EDX analysis result, FIGS. 10A and 10B show TEM photographs of a catalyst for a fuel cell prepared according to Example 2, and FIG. 11 is its EDX analysis result. As shown in FIGS. 8A and 8B, the catalyst prepared according to Reference Example 2 turned out to be 3 to 4 nm in particle size, and mostly 3.5 nm. On the other hand, as shown in FIGS. 10A and 10B, a catalyst prepared according to Example 2 turned out to be 3 to 4 nm in particle size, and mostly about 3 nm. Most were formed as smaller particles than those of Reference Example 2, even if extremely few of them were amassed at about 5 nm.

Figure 8C:
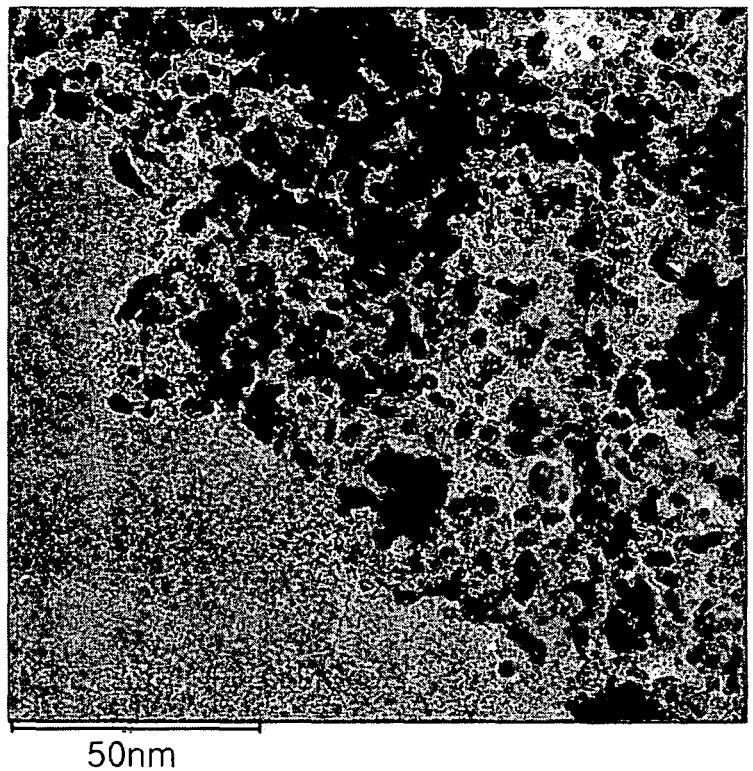
Figure 10C:
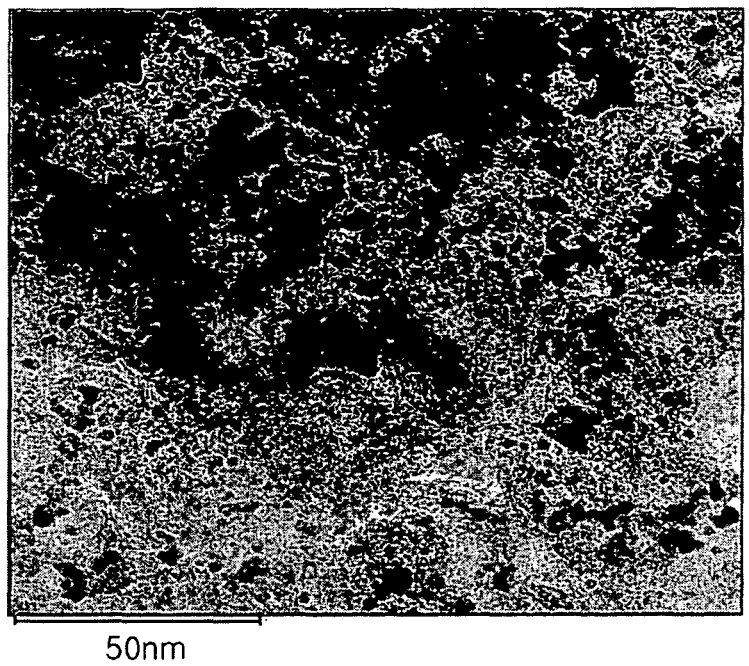

In addition, as shown in FIGS. 8C and 10C, the catalysts prepared according to Reference Example 2 and Example 2 revealed that a catalyst metal existing inside a carrier was entirely well-dispersed and had a layered structure like a wave despite its partial coagulation.

Furthermore, referring to the EDX analysis result in FIG. 9, a catalyst prepared according to Reference Example 2 comprised Pt, O, Si, and so on, but a catalyst prepared according to Example 2 had little Si, because a supporting aid was removed through NaOH treatment. Cu was shown in the EDX analysis, because it was used as a specimen holder.

REFERENCE EXAMPLE 3

Here, 704.61 mg of desulfurized ketjen black instead of Vulcan-X and the same amount of fumed silica were used, and the processes were the same as in the above Reference Example 2 except for injecting a Ru precursor aqueous solution which was prepared by adding 469.2 m of $RuCl_3$ to 50 ml of $H_2O$ 50 ml at the speed of 2 ml/m after the oxidation decomposition reaction with $H_2O_2$. The whole reaction in Reference Example 3 was performed, while regulating NaOH to be at a 5 wt % concentration to maintain pH 4.5 to 5.

EXAMPLE 3

A catalyst prepared according to Reference Example 3 was maintained in a 60° C. vacuum oven for one day, treated for two hours with 0.5M of NaOH to remove the fumed silica, filtered, washed, and dried in an oven, to prepare a catalyst for a fuel cell.

Figure 12A:
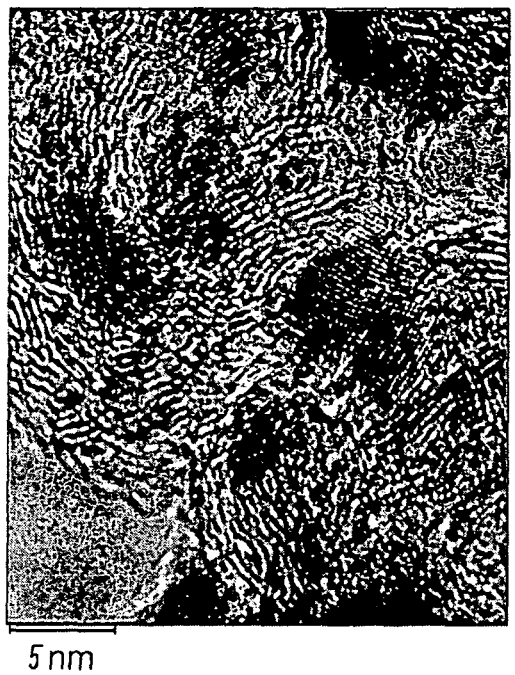
FIG. 12A to FIG. 12C are TEM photographs of the catalyst for a fuel cell prepared according to Reference Example 3.
Figure 12B:
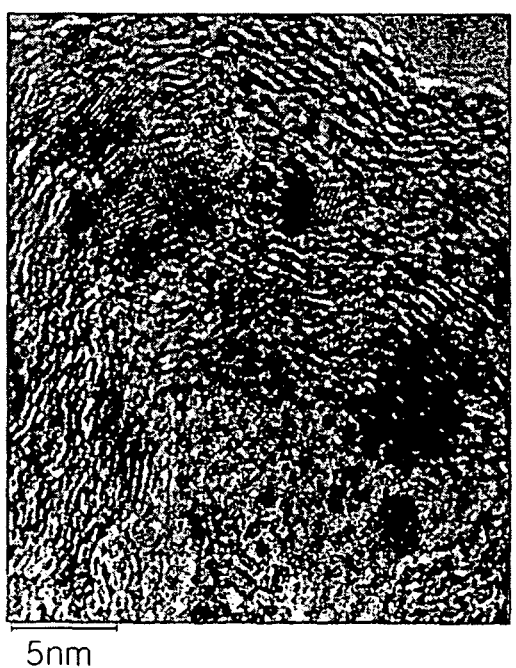
Figure 13:
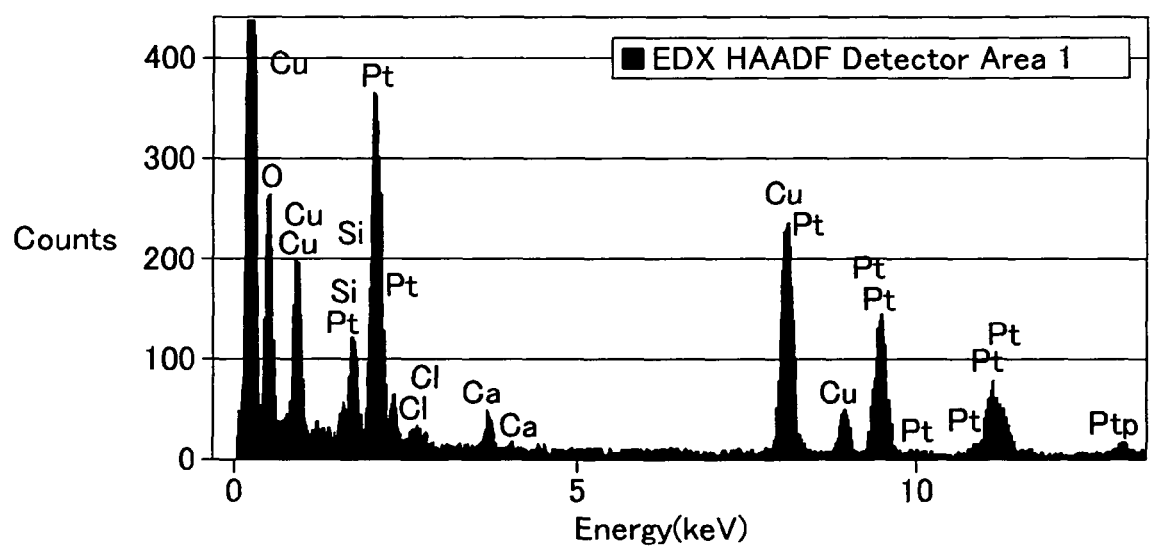
FIG. 13 is an EDX analysis graph of the catalyst prepared according to Reference Example 3.
Figure 14A:
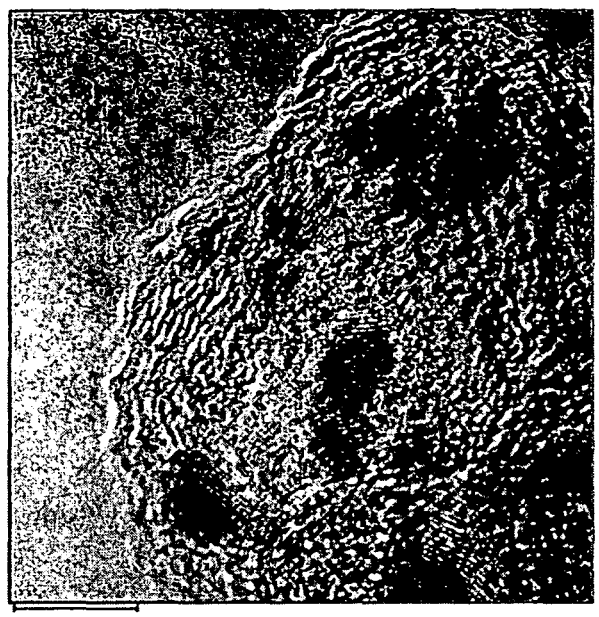
FIG. 14A to FIG. 14C are TEM photographs of the catalyst for a fuel cell prepared according to Example 3.
Figure 14B:
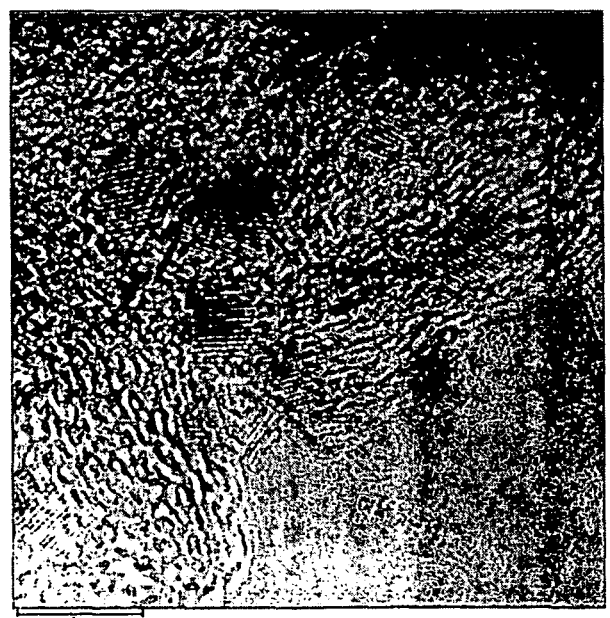
Figure 15:
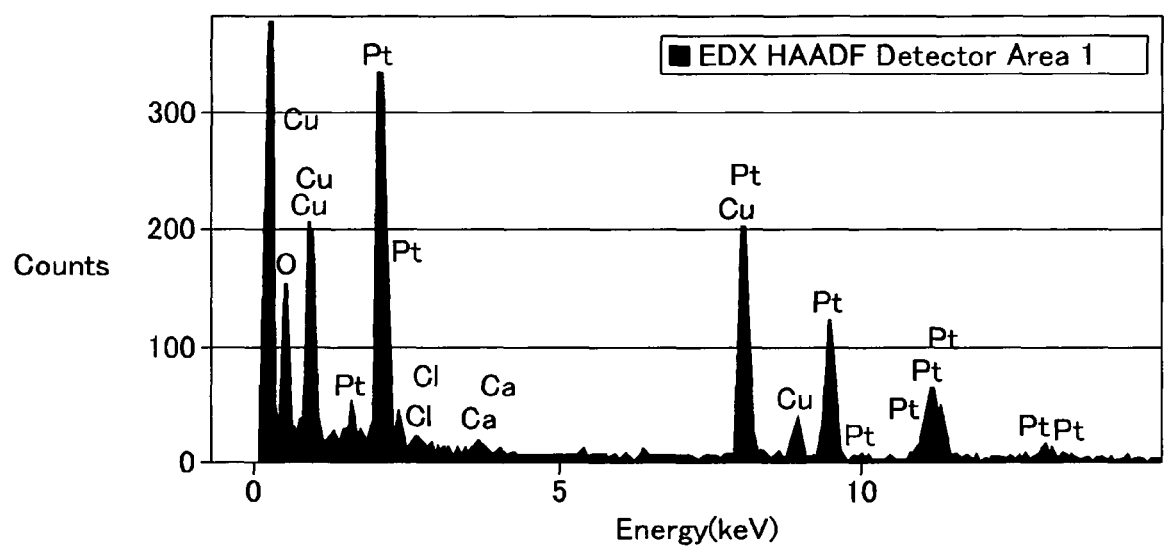
FIG. 15 is an EDX analysis graph of the catalyst prepared according to Example 3.

FIGS. 12A and 12B show TEM photographs of a catalyst for a fuel cell prepared according to Reference Example 3, and FIG. 13 shows its EDX analysis result. FIGS. 14A and 14B show TEM photographs of a catalyst for a fuel cell prepared according to Example 3, and FIG. 15 shows its EDX analysis result. As shown in FIGS. 12A and 12B, the particle size of a catalyst prepared according to Reference Example 3 was in the range of 3 to 4 nm in size, and mostly 3 nm, and had a more developed layered structure than that of Example 3.

On the other hand, as shown in FIGS. 14A to 14B, a catalyst prepared according to Example 3 was mostly formed at about 3 nm in particle size and few large-sized catalyst particles were found.

Figure 12C:
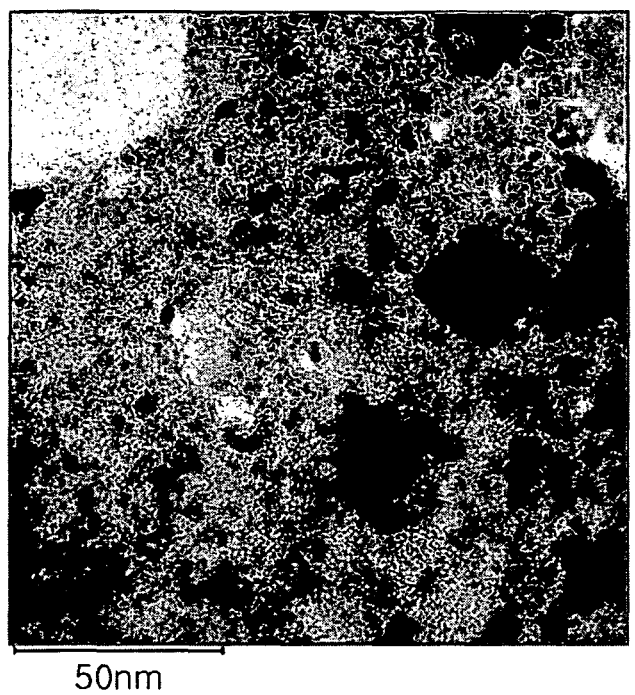
Figure 14C:
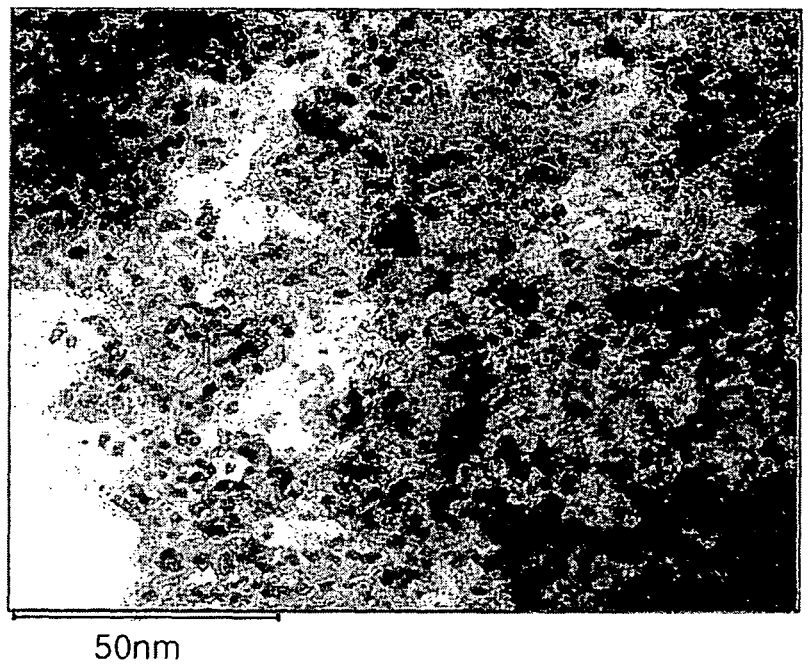

In addition, as shown in FIGS. 12C and 14C, catalysts prepared according to Reference Example 3 and Example 3 were well-dispersed even though a catalyst metal therein was partially coagulated, and Pt particles were not clearly formed.

Furthermore, the EDX analysis result in FIG. 13 shows that a catalyst prepared according to Reference Example 3 comprised Pt, Cl, Ca, O, Si, and so on, but a catalyst prepared according to Example 2, in which the supporting aid was removed, had no Si with a NaOH treatment. Cu shown in the EDX analysis was used was a specimen holder.

In conclusion, a catalyst for a fuel cell in the present invention can be used as a self-humidifying catalyst, because it includes a hydrophilic compound. In addition, since it has a high catalyst metal supporting ratio and excellent dispersion when supported on a carrier, it can contribute to providing a fuel cell with advantageous properties and have a great influence on a fuel oxidation reaction.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A catalyst for a fuel cell, comprising:
   a compound comprising zeolite, the compound having a property of absorbing water, the compound being present in an amount ranging from 0.1 to 15 wt % based on the total weight of the catalyst; and
   catalytic metal, the catalyst having a diameter of less than or equal to 5 nm, the catalytic metal being a black catalyst not being supported on a carrier.

2. The catalyst of claim 1, wherein the compound is an oxide.

3. The catalyst of claim 1, wherein the compound is uniformly present in the catalyst.

4. The catalyst of claim 1, wherein the catalytic metal is selected from the group consisting of platinum and an alloy of platinum-transition elements, and the transition element is at least one selected from the group consisting of V, Cr, Mn, Fe, Co, Ni, Cu, Ru, Ir, W, Mo, and Rh.

5. The catalyst of claim 1, wherein the catalyst has a layered structure.

6. A method of preparing a catalyst for a fuel cell, comprising:
   adding a compound including zeolite to a catalytic metal precursor solution to prepare a catalyst precursor,
   heat-treating the catalyst precursor; and
   subjecting the heat treated catalyst precursor to an acid or base treatment to obtain the catalyst, which comprises the compound and the catalytic metal, the compound having a property of absorbing water, the compound being present in an amount ranging from 0.1 to 15 wt % based on the total weight of the catalyst, the catalyst having a diameter of less than or equal to 5 nm, the catalytic metal being a black catalyst not being supported on a carrier.

7. The method of claim 6, wherein the compound is an oxide.

8. The method of claim 6, wherein the compound comprises at least one selected from the group consisting of fumed silica, alumina, zeolite, and titania.

9. The method of claim 6, wherein the heat treatment is performed under a reducing atmosphere.

10. The method of claim 6, wherein the acid is selected from the group consisting of sulfuric acid, hydrochloric acid, phosphoric acid, and nitric acid, and
    the base is selected from the group consisting of NaOH, KOH, $NH_3OH$, $NH_3CO_3$, and $Na_2CO_3$.

11. The method of claim 6, further comprising drying the catalyst precursor before heat treatment.

12. A method of preparing a catalyst for a fuel cell, comprising:
    preparing a solution by adding a compound including zeolite to a reducing agent solution;
    adding a catalytic metal precursor to the solution to prepare a mixture;
    reducing the mixture; and
    filtrating the reduced product to obtain the catalyst, which comprises the compound and the catalytic metal, the compound having a property of absorbing water, the compound being present in an amount ranging from 0.1 to 15 wt % based on the total weight of the catalyst, the catalyst having a diameter of less than or equal to 5 nm, the catalytic metal being a black catalyst not being supported on a carrier.

13. The method of claim 12, wherein the compound is an oxide.

14. The method of claim 12, wherein the compound comprises at least one selected from the group consisting of fumed silica, alumina, zeolite, and titania.

15. The method of claim 12, wherein the preparation of the solution is performed in the range of pH 4 to 4.5.

16. The method of claim 12, wherein the reduction of the mixture is performed through treatment of hydrogen gas or heat-treatment.

17. The method of claim 12, further comprising performing an oxidation decomposition reaction to the mixture after preparing the mixture and before reducing the mixture.

18. A fuel cell system, comprising:
    at least one electricity generating element generating electricity through oxidation of fuel and reduction of an oxidant, the electricity generating element comprising:
    a membrane-electrode assembly comprising:
    a cathode and an anode facing each other, the anode and the cathode comprising a catalyst, the catalyst comprising a compound having a property of absorbing water and a catalytic metal, the compound including zeolite, the compound being present in an amount ranging from 0.1 to 15 wt % based on the total weight of the catalyst, the catalyst having a diameter of less than or equal to 5 nm, the catalytic metal being a black catalyst not being supported on a carrier; and
    a polymer electrolyte membrane positioned between the anode and the cathode; and
    separators positioned at both sides of the membrane-electrode assembly;
    a fuel supplier supplying the fuel to the electricity generating element; and
    an oxidant supplier supplying the oxidant to the electricity generating element.

19. The fuel cell system of claim 18, wherein the fuel is hydrogen.

20. The fuel cell system of claim 18, wherein the compound is an oxide.

* * * * *